US011180393B2

(12) United States Patent
Cho et al.

(10) Patent No.: US 11,180,393 B2
(45) Date of Patent: Nov. 23, 2021

(54) ANAMMOX REACTOR AND WATER TREATMENT METHOD USING THE SAME

(71) Applicant: DOOSAN HEAVY INDUSTRIES & CONSTRUCTION CO., LTD., Changwon-si (KR)

(72) Inventors: Hwan Chul Cho, Suwon-si (KR); Chul Woo Lee, Changwon-si (KR); Su Nam You, Yongin-si (KR); Yang Oh Jin, Yongin-si (KR)

(73) Assignee: DOOSAN HEAVY INDUSTRIES & CONSTRUCTION C, Gyeongsangnam-do (KR)

( * ) Notice: Subject to any disclaimer, the term of this patent is extended or adjusted under 35 U.S.C. 154(b) by 168 days.

(21) Appl. No.: 16/530,989

(22) Filed: Aug. 2, 2019

(65) Prior Publication Data
US 2020/0079668 A1    Mar. 12, 2020

(30) Foreign Application Priority Data

Sep. 7, 2018 (KR) .......... 10-2018-0106810
Sep. 7, 2018 (KR) .......... 10-2018-0106811
Sep. 7, 2018 (KR) .......... 10-2018-0106812

(51) Int. Cl.
*C02F 3/30* (2006.01)
*C02F 3/34* (2006.01)
(Continued)

(52) U.S. Cl.
CPC .............. *C02F 3/307* (2013.01); *C02F 3/006* (2013.01); *C02F 3/2866* (2013.01); *C02F 3/341* (2013.01);
(Continued)

(58) Field of Classification Search
CPC ........ C02F 3/307; C02F 3/006; C02F 3/2866; C02F 3/341; C02F 2001/007;
(Continued)

(56) References Cited

U.S. PATENT DOCUMENTS

| 9,346,694 B2 * | 5/2016 | Wett ........................ C02F 3/305 |
| 2017/0043281 A1 * | 2/2017 | Min ................... B01D 21/2433 |
| 2020/0298279 A1 * | 9/2020 | Jung ....................... B07B 13/04 |

FOREIGN PATENT DOCUMENTS

| JP | 2013-236996 A | 11/2013 |
| KR | 20-0128277 B | 10/1998 |

(Continued)

OTHER PUBLICATIONS

Wikipedia. Anammox.
Naver blog.

*Primary Examiner* — Nam X Nguyen
*Assistant Examiner* — Julia L. Wun
(74) *Attorney, Agent, or Firm* — Invenstone Patent, LLC

(57) ABSTRACT

An anammox reactor capable of improving nitrogen removal efficiency by maintaining activity of microorganisms, and a water treatment method using the anammox reactor are provided. The anammox reactor includes a raw water feed pipe through which raw water is supplied, a raw water discharge pipe through which raw water is discharged to an outside, and a first chamber configured to accommodate ammonium oxidizing bacteria (AOB) and anammox bacteria for performing an anammox process, wherein the raw water feed pipe and the raw water discharge pipe are configured to communicate with the first chamber.

20 Claims, 11 Drawing Sheets

(51) Int. Cl.
*C02F 3/00* (2006.01)
*C02F 3/28* (2006.01)
*C02F 101/16* (2006.01)
*C02F 1/00* (2006.01)

(52) U.S. Cl.
CPC .... *C02F 2001/007* (2013.01); *C02F 2101/16* (2013.01); *C02F 2209/14* (2013.01); *C02F 2209/15* (2013.01); *C02F 2209/40* (2013.01)

(58) Field of Classification Search
CPC ........ C02F 2101/16; C02F 1/001; C02F 9/00; C02F 1/008; C02F 2209/40; C02F 2209/14; C02F 2209/15; C02F 2209/001; B01D 33/00
USPC .................................................. 210/601, 903
See application file for complete search history.

(56) References Cited

FOREIGN PATENT DOCUMENTS

| | | |
|---|---|---|
| KR | 10-2012-0129974 A | 11/2012 |
| KR | 10-1692162 B | 1/2017 |
| KR | 10-1792604 B1 | 11/2017 |
| KR | 10-2017-0132429 A | 12/2017 |
| KR | 10-1809127 B1 | 12/2017 |

\* cited by examiner

ANAMMOX REACTOR AND WATER TREATMENT METHOD USING THE SAME

CROSS REFERENCE TO RELATED APPLICATIONS

This application claims priority to Korean Patent Application Nos. 10-2018-0106810, 10-2018-0106811, and 10-2018-0106812 filed on Sep. 7, 2018, the disclosure of which are incorporated herein by reference in their entireties.

BACKGROUND

1. Field

Apparatuses and methods consistent with exemplary embodiments relate to an anammox reactor and a water treatment method using the same and, more particularly, to an anammox reactor capable of improving nitrogen removal efficiency by maintaining an adequate microorganism activity and effectively managing microorganisms contained in the anammox reactor and capable of maintaining the stability of an anammox process and greatly reducing a hydraulic retention time (HRT), and a water treatment method using the anammox reactor.

2. Description of the Related Art

The causes of water pollution include organic matter and minerals such as nitrogen and phosphorus. Nitrogen is one of the nutrients causing eutrophication and red tide, promoting a generation of harmful algae blooms, and increasing the chemical oxygen demand (COD). Organic matter should be removed because it reduces an amount of dissolved oxygen (DO) in a water body.

As a method for treating wastewater containing such various pollutants, there is an approach of utilizing the metabolism of underwater microorganisms.

Typically, wastewater is treated by decomposing organic matter using aerobic microorganisms in a reactor. However, such a related art wastewater treatment method has a disadvantage of requiring high power consumption for operation of an air diffuser or blower to supply air into the reactor.

For example, an operation of blowers accounts for about 40% of a total power consumption of a sewage treatment plant where nitrogen in wastewater is generally removed by nitrification/denitrification (i.e., heterotrophic denitrification) processes (e.g., MLE, A2O processes, etc.).

However, nitrification/denitrification for nitrogen removal has many problems: it is necessary to supply a large amount of air to nitrify ammonia into nitrate; organic matter needs to be added because it is required for denitrification; and a large amount of sludge is generated, resulting in an increase in sludge treatment cost.

To solve these problems, anaerobic ammonium oxidation (anammox) is proposed for nitrogen removal. Anammox removes nitrogen by reacting ammonia with nitrite to produce a nitrogen gas. It is known as an economical process because it can reduce power consumption for ammonia oxidation, does not require addition of organic matter, and can reduce the amount of sludge generated.

In an ordinary sequencing batch reactor (SBR), an anammox process is performed in one reactor to remove nitrogen. However, the SBR has a disadvantage that an operation ratio of a reactor is inversely proportional to a discharge rate and a nitrogen removal rate due to its characteristics such as time divisional operations and nitrogen removal through nitrification and denitrification. Therefore, there is a limit in improving oxygen removal efficiency with the SBR technology.

Accordingly, it is necessary to improve nitrogen removal efficiency in an SBR anammox reactor and to stably maintain an anammox process in the SBR anammox reactor.

SUMMARY

Aspects of one or more exemplary embodiments provide an anammox reactor capable of improving nitrogen removal efficiency by maintaining a proper microorganism activity, and a water treatment method using the same anammox reactor.

Aspects of one or more exemplary embodiments also provide an anammox reactor including a microbial separation filter capable of appropriately controlling and managing microorganisms and a water treatment method using the same.

Aspects of one or more exemplary embodiments further provide an anammox reactor having a settling basin capable of stably maintaining an anammox process and greatly reducing a hydraulic retention time (HRT), and a water treatment method using the same.

Additional aspects will be set forth in part in the description which follows and, in part, will become apparent from the description, or may be learned by practice of the exemplary embodiments.

According to an aspect of an exemplary embodiment, there is provided an anammox reactor including: a raw water feed pipe through which raw water is supplied; a raw water discharge pipe through which raw water is discharged to an outside, and a first chamber configured to accommodate ammonium oxidizing bacteria (AOB) and annamox bacteria, wherein the raw water feed pipe and the raw water discharge pipe are configured to communicate with the first chamber.

The anammox reactor may further include a first controller configured to measure a concentration of nitrogen compounds contained in the raw water supplied to the first chamber, and a second controller configured to control a flow rate of the raw water supplied to the first chamber such that a concentration of ammonium ions ($NH_4^+$) contained in the raw water stored in the first chamber is maintained within a predetermined range.

The anammox bacteria may be any one or more species selected from the group consisting of *Candidatus Kuenenia*, *Candidatus Brocadia*, *Candidatus Anammoxoglobus*, *Candidatus Jettenia*, and *Candidatus Scalindua*.

The first controller may include a first measuring unit configured to measure a concentration of ammonium ions ($NH_4^+$), a second measuring unit configured to measure a concentration of nitrite ions ($NO_2^-$), and a third measuring unit configured to measure a concentration of nitrate ions ($NO_3^-$).

The first measuring unit may include a first calculator configured to measure the concentration of ammonium ions ($NH_4^+$) for a unit time and calculate an amount of decrease in ammonium ions ($NH_4^+$) for the unit time, the second measuring unit may include a second calculator configured to measure the concentration of nitrite ions ($NO_2^-$) for the unit time and calculate an amount of produced nitrite ions ($NO_2^-$) for the unit time, and the third measuring unit may include a third calculator configured to measure the concentration of nitrate ions ($NO_3^-$) for the unit time and calculate an amount of produced nitrate ions ($NO_3^-$) for the unit time.

The second controller may control the flow rate of the raw water supplied to the first chamber according to a value calculated by Expression 1, $$Q = \frac{[NO_{2gen}^-] + [NO_{3gen}^-]}{[NH_{4rem}^+]} \quad \text{[Expression 1]}$$

wherein if the calculated value is 0.7 or greater, the second controller may control the flow rate of the raw water such that the concentration of ammonium ions ($NH_4^+$) in the first chamber is maintained within a range from 50 to 100 mg/L, and if the calculated value is less than 0.7, the second controller may control the flow rate of the raw water such that the concentration of ammonium ions ($NH_4^+$) in the first chamber is maintained within a range from 100 to 250 mg/L.

The anammox reactor may further include a filtration module provided in the first chamber and configured to filter out some microorganisms according to sizes of the microorganisms.

The filtration module may include a first filter configured to filter some microorganisms out according to sizes of the microorganisms, a second filter configured to filter some microorganisms out according to sizes of the microorganisms, and a shaft connecting the first filter and the second filter.

The anammox reactor may further include a raw water return pipe configured to return a portion of the raw water transported through the raw water discharge pipe to the first chamber, wherein the raw water passing through the filtration module is discharged to the outside through the raw water discharge pipe.

The anammox reactor may further include a second chamber located downstream of the first chamber and configured to cause solids in the raw water supplied from the first chamber to settle to produce sludge, a return pipe configured to return the sludge generated in the second chamber to the first chamber, and an air diffuser configured to inject air into the return pipe to supply bubbles to the first chamber.

The anammox reactor may further include an agitator provided in the first chamber and configured to agitate the raw water introduced into the first chamber.

A number of the agitators provided in the first chamber may be two or more, the two or more agitators being arranged in a vertical direction, and a perforated plate may be provided between each of the agitators arranged in the vertical direction.

According to an aspect of another exemplary embodiment, there is provided a water treatment method of removing nitrogen contained in raw water using an anammox reactor accommodating anammox bacteria, the method including: measuring, by a first controller, a concentration of a nitrogen compound contained in raw water contained in a first chamber; and controlling, by a second controller, a feed flow rate of the raw water supplied to the first chamber so that a concentration of ammonium ions ($NH_4^+$) in the raw water contained in the first chamber is maintained within a predetermined range.

The anammox bacteria may be any one or more species selected from the group consisting of Candidatus Kuenenia, Candidatus Brocadia, Candidatus Anammoxoglobus, Candidatus Jettenia, and Candidatus Scalindua.

The measuring the concentration of the nitrogen compound may include measuring the concentration of ammonium ions ($NH_4^+$), measuring a concentration of nitrite ions ($NO_2^-$), and measuring a concentration of nitrate ions ($NO_3^-$).

The measuring the concentration of ammonium ions ($NH_4^+$) may include measuring a change in the concentration of ammonium ions ($NH_4^+$) per unit time and calculating an amount of reduced ammonium ions ($NH_4^+$) for the unit time, the measuring the concentration of nitrite ions ($NO_2^-$) may include measuring a change in the concentration of nitrite ions ($NO_2^-$) per unit time and calculating an amount of produced nitrite ions ($NO_2^-$) for the unit time, and the measuring the concentration of nitrate ions ($NO_3^-$) may include measuring a change in the concentration of nitrate ions ($NO_3^-$) per unit time and calculating an amount of produced nitrate ions ($NO_3^-$) for the unit time.

In the controlling the feed flow rate of the raw water supplied to the first chamber, the flow rate of the raw water supplied to the chamber may be controlled according to a value calculated by Expression 1, $$Q = \frac{[NO_{2gen}^-] + [NO_{3gen}^-]}{[NH_{4rem}^+]} \quad \text{[Expression 1]}$$

wherein if the calculated value is 0.7 or greater, the second controller may control the flow rate of the raw water such that the concentration of ammonium ions ($NH_4^+$) in the first chamber is maintained within a range from 50 to 100 mg/L, and if the calculated value is less than 0.7, the second controller may control the flow rate of the raw water such that the concentration of ammonium ions ($NH_4^+$) in the first chamber is maintained within a range from 100 to 250 mg/L.

The water treatment method may further include supplying the raw water discharged from the first chamber to a second chamber in which solids in the raw water settle to produce sludge and returning the sludge generated in the second chamber to the first chamber.

In the measuring the concentration of the nitrogen compound, the raw water in the first chamber may be agitated by an agitator provided in the first chamber.

After the controlling the flow rate of the raw water supplied to the first chamber, the raw water may pass through a filtration module provided in the first chamber and flow out through a raw water discharge pipe.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
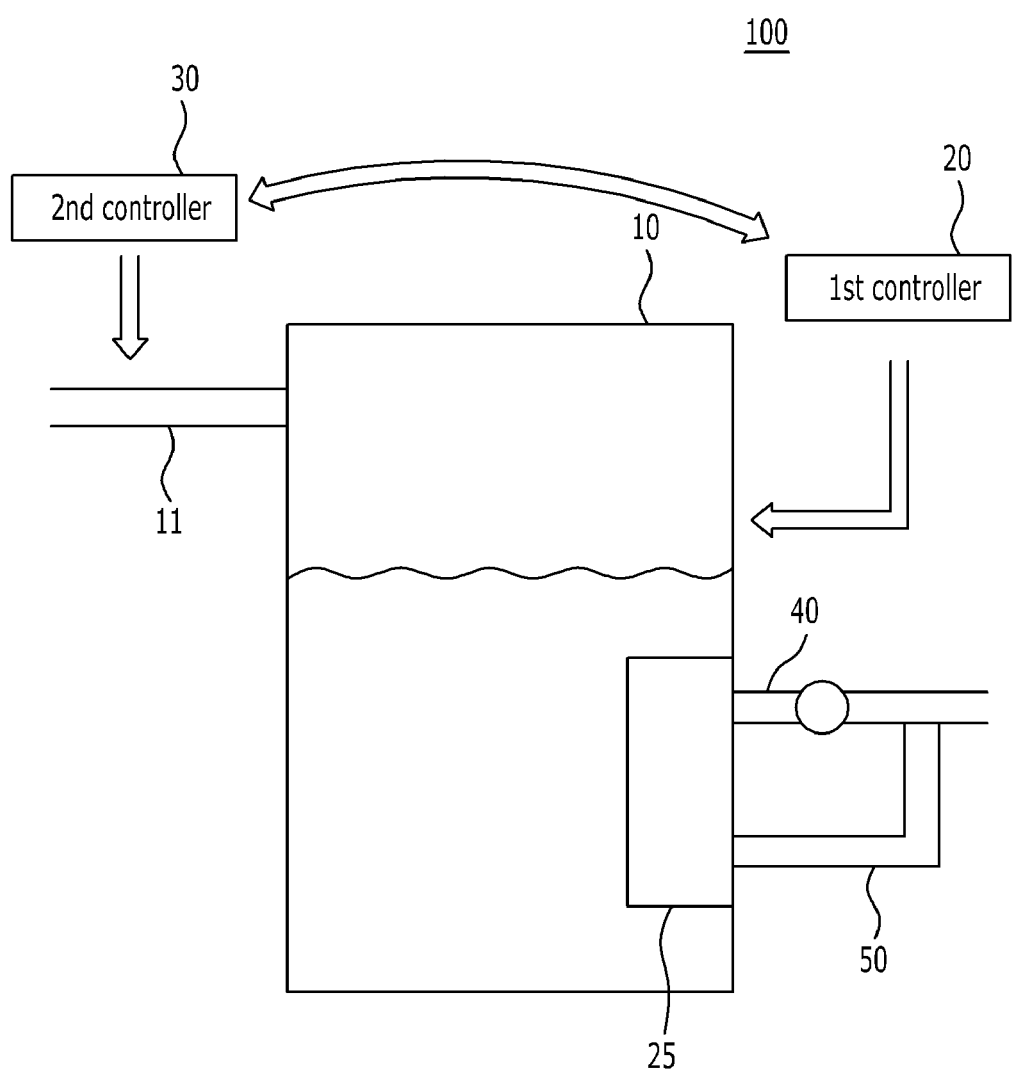
FIG. 1 is a schematic view illustrating an anammox reactor according to an exemplary embodiment.

Various modifications may be made to the embodiments of the disclosure, and there may be various types of embodiments. Thus, specific embodiments will be illustrated in drawings, and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, the terms such as "comprises", "includes", and/or "have/has" should be construed as designating that there are such features, regions, integers, steps, operations, elements, components, and/or a combination thereof in the specification, not to exclude the presence or possibility of adding one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

Hereinbelow, exemplary embodiments will be described with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a schematic view illustrating an anammox reactor 100 according to an exemplary embodiment. Referring to FIG. 1, the anammox reactor 100 may include a first chamber 10 configured to accommodate ammonium oxidizing bacteria (AOB) and annamox bacteria, a water feed pipe 11 through which raw water is supplied to the first chamber 10, a first controller 20 configured to measure a concentration of nitrogen compounds contained in the raw water supplied to the first chamber 10, and a second controller 30 configured to control a feed flow rate of the raw water flowing into the first chamber 10 such that a concentration of ammonium ions ($NH_4^+$) contained in the raw water stored in the first chamber 10 is maintained within a predetermined range.

ANAMMOX is an abbreviation of ANaerobic AMMonium Oxidation and refers to a microorganism species whose metabolization is based on nitrogen or a process using the microorganism. ANAMMOX is a technology of reducing nitrogen compounds into nitrogen gas and releasing the nitrogen gas to the air, and has recently attention in a sewage treatment field. In the anammox process, ammonia oxidizing bacteria first oxidizes half of ammonium ions to produce nitrite ions ($NO_2^-$), as shown in Chemical Formula 1 below.

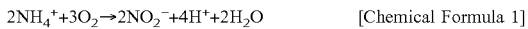

$$2NH_4^+ + 3O_2 \rightarrow 2NO_2^- + 4H^+ + 2H_2O \qquad \text{[Chemical Formula 1]}$$

Next, anammox bacteria (also referred to as anammox microorganism) causes ammonium ions and nitrite ions to reach each other to generate nitrogen as shown in Chemical Formula 2 below. Thus, nitrogen compounds are removed as nitrogen gas. In this case, the ammonium ions and the nitrite ions react at a molar ratio of about 1:1.

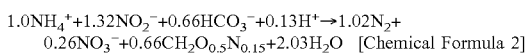

$$1.0NH_4^+ + 1.32NO_2^- + 0.66HCO_3^- + 0.13H^+ \rightarrow 1.02N_2 +$$
$$0.26NO_3^- + 0.66CH_2O_{0.5}N_{0.15} + 2.03H_2O \qquad \text{[Chemical Formula 2]}$$

The exemplary embodiment is a technique of improving nitrogen removal efficiency in an anammox reaction process and finds its application in an SBR water treatment method For example, the concentration of nitrogen compounds in the anammox reactor 100 is measured, and the flow feed rate of the raw water is adaptively controlled in accordance with the concentration of the nitrogen compounds so that the concentration of the ammonium ions in the anammox reactor 100 can be appropriately maintained. That is, an activity and metabolism of nitrite oxidizing bacteria (NOB) is effectively suppressed, resulting in an increase in nitrogen removal efficiency.

The first chamber 10 receives raw water through the water feed pipe 11 provided at one end thereof and accommodates ammonium oxidizing bacteria (AOB) and annamox bacteria therein. A shape of the first chamber 10 is not particularly limited, and can be diversely designed according to a structure of a water treatment apparatus. For example, it may be a cylindrical shape or a square columnar shape. The aerobic ammonium oxidizing bacteria (AOB) contained in the first chamber 10 may be *Nitrosomonas* or *Nitrosococcus*. The anammox microorganisms may be one or more species selected from the group consisting of *Candidatus Kuenenia, Candidatus Brocadia, Candidatus Anammoxoglobus, Candidatus Jettenia,* and *Candidatus Scalindua.*

Figure 2:
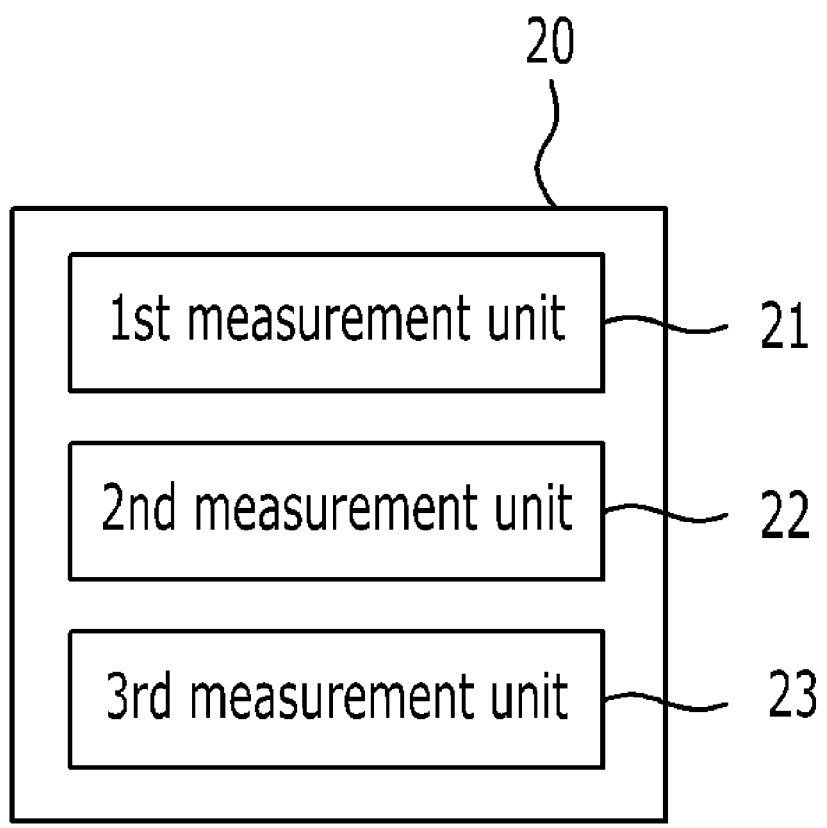
FIG. 2 is a diagram illustrating a first controller.

The first controller 20 measures the concentration of nitrogen compounds contained in the raw water supplied into and stored in the first chamber 10. The nitrogen compounds include ammonium ions ($NH_4^+$), nitrite ions ($NO_2^-$), nitrate ions ($NO_3^-$), and various salt forms thereof. The concentration of the nitrogen compounds may be measured using various sensors known in the art. Referring to FIG. 2, the first controller 20 may include a first measuring unit 21 for measuring the concentration of ammonium ions ($NH_4^+$), a second measuring unit 22 for measuring the concentration of nitrite ions ($NO_2^-$), and a third measuring unit 23 for measuring the concentration of nitrate ions ($NO_3^-$). The first measuring unit 21 may include a first calculator for calculating an amount of reduced ammonium ions ($NH_4^+$) per unit time from a change in the concentration of ammonium ions ($NH_4^+$) measured, the second measuring unit 22 may include a second calculator for calculating an amount of produced nitrite ions ($NO_2^-$) per unit time from a change in the concentration of nitrite ions ($NO_2^-$) measured, and the third measuring unit 23 may include a third calculator for calculating an amount of produced nitrate ions ($NO_3^-$) per unit time from a change in the concentration of nitrate ions ($NO_3^-$) measured.

When aerobic ammonium oxidizing bacteria (AOB) and anammox bacteria are mixed in a reactor, it is important to appropriately control activities of the two kinds of bacteria (microorganisms). In a case of a related art anammox reactor, because process conditions are adjusted according to a ratio of the amount of produced nitrite ions ($NO_2^-$) to the amount of reduced ammonium ions ($NH_4^+$), nitrogen removal efficiency is low. In order to solve this problem, the first controller 20 measures a change in the concentration of nitrogen compounds including nitrite ions ($NO_3^-$) by using the first measuring unit 21, the second measuring unit 22, and the third measuring unit 23, and the second controller 30 controls the feed flow rate of the raw water introduced into the first chamber 10 according to the concentration of nitrogen compounds, thereby improving the nitrogen removal efficiency.

The second controller 30 exchanges data with the first controller 20 and controls the feed flow rate of the raw water on the basis of the concentration of nitrogen compounds measured by the first controller 20. Because the activity of ammonium oxidizing bacteria (AOB) and annamox bacteria cannot always be maintained uniformly in the anammox reactor 100, a case is likely to occur in which a ratio of the amount of reduced ammonium ions ($NH_4^+$) and the amount of produced nitrite ions ($NO_2^-$) is not 1:1. In the first chamber 10, if the activity of the anammox bacteria is higher than the activity of the ammonia oxidizing bacteria (AOB), the AOB changes the ammonium ions ($NH_4^+$) into the nitrite ions ($NO_2^-$), and the anammox bacteria causes the ammonium ions ($NH_4^+$) and the nitrite ions ($NO_2^-$) to react with each other to produce a nitrogen gas. Therefore, the nitrite ions ($NO_2^-$) rarely accumulate in the first chamber 10. In this case, operation conditions need to be controlled such that the amount of ammonium ions ($NH_4^+$) increases. Thus, the second controller 30 increases the feed flow rate of the raw water by controlling a pump, a valve, etc. connected to the water feed pipe 11. If the process control is performed in such a manner that the concentration of ammonium ions ($NH_4^+$) in the first chamber 10 is increased, because the activity of the nitrite oxidizing bacteria (NOB) is inhibited due to the increase in the concentration of free ammonia and a high alkalinity, the efficiency of the operation process is improved and the nitrogen removal effect is enhanced.

The second controller 30 controls the feed flow rate of the raw water according to a value calculated by Expression 1 below.

$$Q = \frac{[NO_{2gen}^-] + [NO_{3gen}^-]}{[NH_{4rem}^+]} \qquad \text{[Expression 1]}$$

That is, if a value calculated by Expression 1 is 0.7 or greater, the feed flow rate of the raw water is controlled such that the concentration of ammonium ions ($NH_4^+$) in the first chamber 10 is maintained within a range of 50 to 100 mg/L, while if the value calculated by Expression 1 is less than 0.7, the feed flow rate of the raw water is controlled such that the concentration of ammonium ions ($NH_4^+$) is maintained within a range of 100 to 250 mg/L. These reference values are obtained from various experiments and can be applied to water treatment plants that treat wastewater with a concentration of ammonium ions ($NH_4^+$) in a range of 600 to 1,000 ppm.

Next, a water treatment method for removing nitrogen contained in raw water will be described. In describing the water treatment method, a redundant description will not be described.

A water treatment method according to an exemplary embodiment is a method of removing nitrogen contained in raw water by using the anammox reactor 100. The water treatment method may include a first step of measuring the concentration of nitrogen compounds in raw water stored in the first chamber 10 under control of the first controller 20 and a second step of controlling the flow rate of the raw water supplied to the first chamber 10 under control of the second controller 30 such that the concentration of ammonium ions ($NH_4^+$) in the raw water contained in the first chamber 10 is maintained within a predetermined range. According to the exemplary embodiment, the concentration of nitrogen compounds in the anammox reactor 100 is measured, and the flow feed rate of the raw water is adaptively controlled in accordance with the concentration of the nitrogen compounds so that the concentration of ammonium ions ($NH_4^+$) in the anammox reactor 100 can be appropriately maintained. That is, the activity and metabolism of nitrite oxidizing bacteria (NOB) is effectively suppressed. Therefore, an increase in nitrogen removal efficiency can be increased.

The first step of measuring the concentration of nitrogen compounds in the raw water stored in the first chamber 10 under control of the first controller 20 may include a first sub-step of measuring the concentration of ammonium ions ($NH_4^+$), a second sub-step of measuring the concentration of nitrite ions ($NO_2^-$), and a third sub-step of measuring the concentration of nitrate ions ($NO_3^-$). The first sub-step may include a first calculation step of measuring a change in the concentration of ammonium ions ($NH_4^+$) for a unit time and calculating the amount of reduced ammonium ions ($NH_4^+$) for the unit time. The second sub-step may include a second calculation step of measuring a change in the concentration of nitrite ions ($NO_2^-$) for the unit time and calculating the amount of produced nitrite ions ($NO_2^-$). The third sub-step may include a third calculation step of measuring a change in the concentration of nitrate ions ($NO_3^-$) for the unit time and calculating the amount of produced nitrate ions ($NO_3^-$) for the unit time.

In the second step of controlling the flow rate of the raw water supplied to the first chamber 10 under control of the second controller 30, the feed flow rate of the raw water is controlled according to a value calculated by Expression 1. If the value is 0.7 or greater, the feed flow rate of the raw water is controlled such that the concentration of ammonium ions ($NH_4^+$) in the first chamber 10 is maintained within a range of 50 to 100 mg/L while if the value is less than 0.7, the feed flow rate of the raw water is controlled such that the concentration of ammonium ions ($NH_4^+$) in the first chamber 10 is maintained within a range of 100 to 250 mg/L.

Thus, the concentration of ammonium ions ($NH_4^+$) in the first chamber 10 is maintained at a proper level by monitoring the concentration of each of the nitrogen compounds measured in the first step, thereby effectively controlling the nitride-nitrogen oxidizing bacteria (NOB) and causing the anammox reaction. Thus, a nitrogen removal effect can be enhanced.

Referring to FIG. 1, the anammox reactor 100 may further include a filtration module 25 provided in the first chamber 10 to separate the microorganisms (i.e., ammonium oxidizing bacteria (AOB) and annamox bacteria) according to sizes of the microorganisms, a raw water discharge pipe 40 through which the raw water passing through the filtration module 25 is discharged, and a raw water return pipe 50 in which a part of the raw water flowing out through the raw water discharge pipe 40 is returned to the first chamber 10.

The first chamber 10 equipped with the filtration module 25 is connected to the raw water feed pipe 11 through which the raw water flows into the first chamber 10, to the raw water discharge pipe 40 through which the raw water flows out, and to the raw water turn pipe 50 through which the raw water is returned to the first chamber 10. For example, the raw water flows into the first chamber 10 through the raw water feed pipe 11, passes through the filtration module 25 provided in the first chamber 10, exits the first chamber 10 through the raw water discharge pipe 40, and returns to the first chamber 10 through the raw water return pipe 50.

Figure 3:
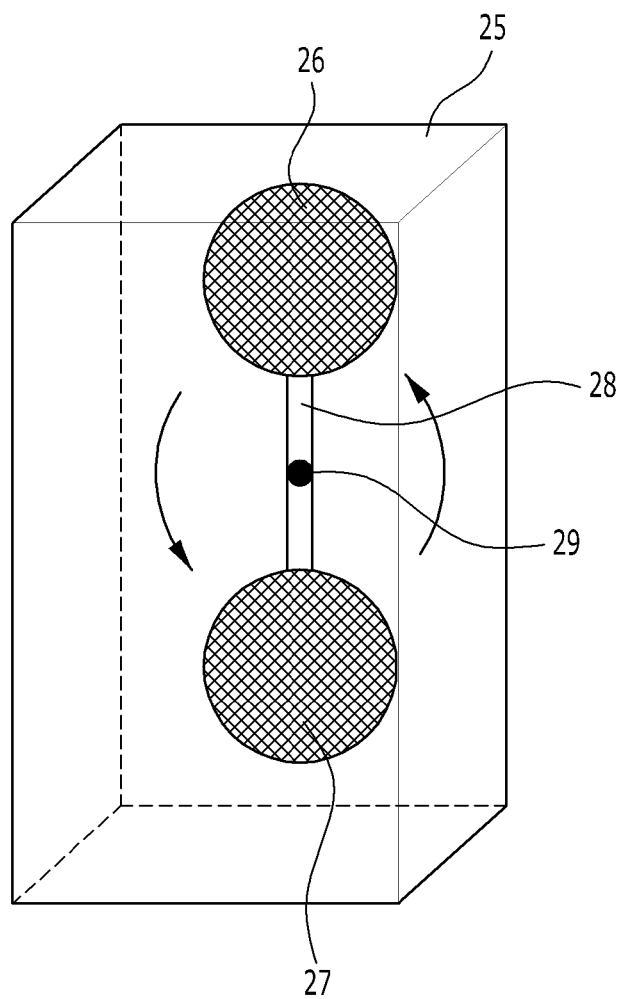
FIG. 3 is a schematic view illustrating a filtration module according to an exemplary embodiment.

FIG. 3 is a schematic view of a filtration module 25 according to an exemplary embodiment. Referring to FIGS. 1 and 3, the filtration module 25 may include a first filter 26 for filtering microorganisms according to their sizes, a second filter 27 for filtering microorganisms according to their sizes, and a shaft 28 connecting the first filter 26 and the second filter 27. The first filter 26 and the second filter 27 may be of the same type or different types, depending on the purpose of the first and second filters 26 and 27. For example, the first filter 26 and the second filter 27 have a pore size that can prevent the ammonia oxidizing bacteria (AOB) and the anammox bacteria accommodated in the first chamber 10 from escaping the first chamber 10.

The first filter 26 and the second filter 27 are connected to each other by the shaft 28 and can rotate about a center point 29 such that positions of the first filter 26 and the second filter 27 can be switched. The first filter 26 is located at a front end of the raw water discharge pipe 40 so that the filtrate passing through the first filter 26 flows into the raw water discharge pipe 40. The second filter 27 is located at a rear end of the raw water return pipe 50 so that the raw water is returned to the first chamber 10 via the second filter 27.

The microorganisms which remain on the surface of the first filter 26 by not being able to pass through the first filter 26 when the raw water flows out through the raw water discharge pipe 40 are washed back to the first chamber 10 when the raw water is returned to the first chamber 10 through the raw water return pipe 50 after the first filter 26 and the second filter 27 are switched in position. Therefore, microorganisms can always be appropriately controlled in the anammox reactor 100, and thus the anammox process can be stably performed.

The water treatment method according to the exemplary embodiment using the anammox reactor 100 shown in FIGS. 1 to 3 may further include a third step of returning a part of the raw water discharged through the raw water discharge pipe 40 to the first chamber 10 via the filtration module 25.

As described above, in the second step of controlling the flow rate of the raw water supplied to the first chamber 10 under control of the second controller 30, the raw water is discharged from the anammox reactor after the anammox process is performed. That is, before the raw water is discharged through the raw water discharge pipe 40, the raw water that has undergone the anammox process is filtered by the filtration module 25. For example, the raw water passes through the first filter 26 of the filtration module 25 which prevents the AOB and the anammox bacteria from passing therethrough, and allows the raw water including other microorganisms to pass therethrough.

In the third step of returning a part of the raw water discharged through the raw water discharge pipe 40 to the first chamber 10, the raw water is returned to the first chamber 10 via the second filter 27 of the filtration module 25.

The first filter 26 and the second filter 27 can be switched in position. That is, after the AOB and the anammox bacteria are filtered out by the first filter 26 in the second step, the first filter 26 and the second filter 27 are switched in position, and the AOB and the anammox bacteria captured by the first filter 26 are washed off and transported back to the first chamber 10 when the raw water is returned to the first chamber 10 in the third step. The same operation is performed when the second filter 27 filters the raw water without allowing the AOB and the anammox bacteria to pass therethrough in the second step.

Figure 4:
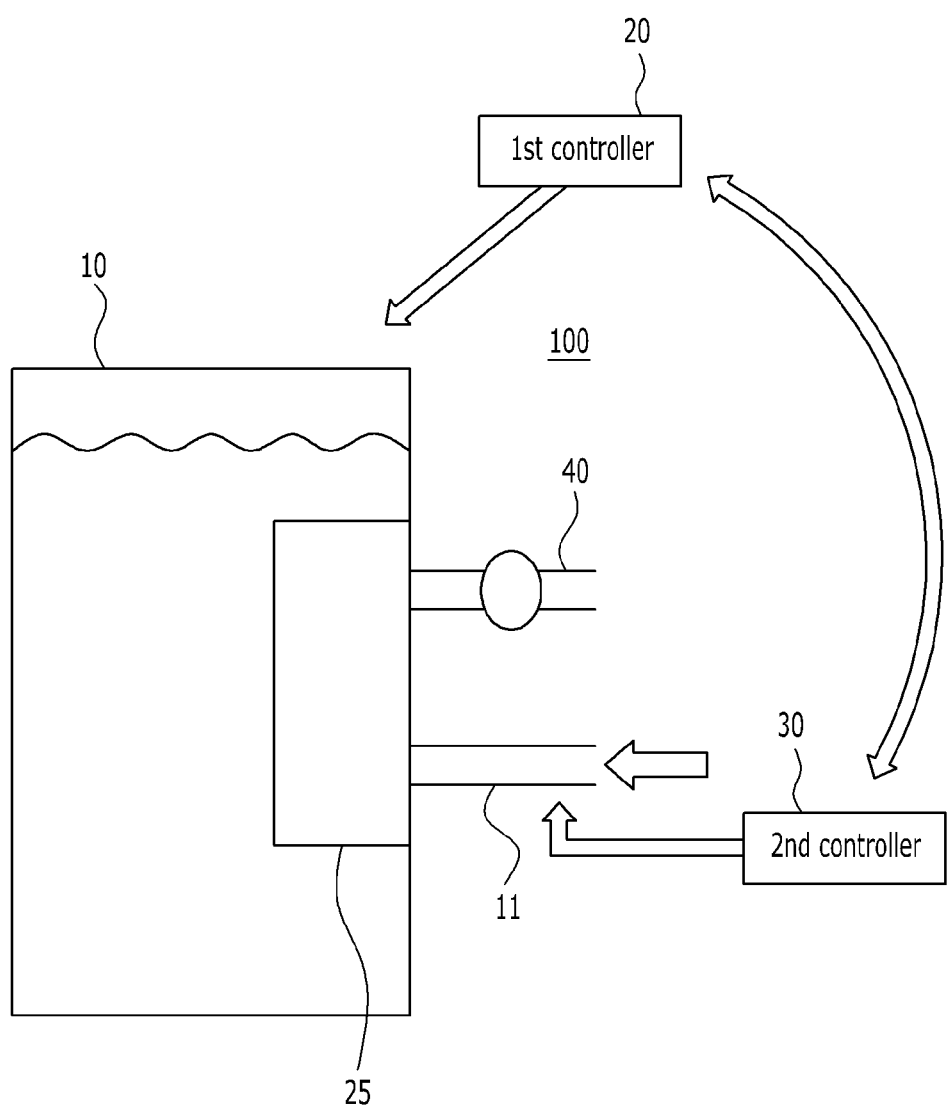
FIG. 4 is a schematic view illustrating an anammox reactor according to a further embodiment of the present invention.

FIG. 4 is a schematic view illustrating an anammox reactor 100 according to an exemplary embodiment. Referring to FIG. 4, the anammox reactor 100 may include a first chamber 10 in which ammonium oxidizing bacteria (AOB) and annamox bacteria are accommodated, a filtration module 25 provided in the first chamber 10 for filtering out microorganisms (i.e., AOB and annamox bacteria) according to sizes of the microorganisms, a raw water feed pipe 11 through which raw water is supplied to the first chamber 10, and a raw water discharge pipe 40 through which the raw water passing through the filtration module 25 is discharged to the outside.

The first chamber 10 includes the filtration module 25 and is connected to the raw water feed pipe 11 through which raw water is supplied to the first chamber 10 and to the raw water discharge pipe 40 through which the raw water passing through the filtration module 25 is discharged from the first chamber 10. For example, the raw water introduced through the raw water feed pipe 11 passes through the filtration module 25 and is received in the first chamber 10.

Referring to FIGS. 3 and 4, the first filter 26 of the filtration module 25 is located at a rear end of the raw water feed pipe 11 so that the raw water passes through the first filter 26 when it is supplied to the first chamber 10. The second filter 27 of the filtration module 25 is located at a front end of the raw water discharge pipe 40 so that the raw water passes through the second filter 27 before entering into the raw water discharge pipe 40.

The first filter 26 and the second filter 27 can be switched in position. Therefore, after the anammox process is performed, the first filter 26 prevents the AOB and the anammox bacteria contained in the raw water from escaping the first chamber 10 when the raw water is discharged through the raw water discharge pipe 40. That is, the AOB and the anammox bacteria are attached to the surface of the first filter 26. Thus, after the first filter 26 and the second filter 27 are switched in position, the AOB and anammox bacteria captured by the first filter 26 are washed back to the first chamber 10 when the raw water is returned to the first chamber 10. The first filter 26 and the second filter 27 may be switched in position such that their functions are also switched.

The anammox reactor 100 may further include the first controller 20 for measuring the concentration of nitrogen compounds contained in the raw water supplied into and contained in the first chamber 10 and the second controller 30 for controlling the feed flow rate of the raw water such that the concentration of ammonium ions ($NH_4^+$) contained in the raw water supplied to and contained in the first chamber 10 is maintained within a predetermined range.

A water treatment method according to an exemplary embodiment using the anammox reactor 100 shown in FIG. 4 may include a first step in which raw water passes through the filtration module 25 and flows into the first chamber 10 and a second step in which nitrogen in the raw water is removed through an anammox process and the raw water that has undergone the anammox process passes through the filtration module 25 and flows out through the raw water discharge pipe 40.

The first step is a process in which the raw water is supplied to the first chamber 10. For example, the raw water flows into the first chamber 10 via the first filter 26 of the filtration module 25.

The second step is a process in which the raw water that has undergone the anammox process is discharged to the outside. For example, the raw water passes through the second filter 27 of the filtration module 25 and flows out through the raw water discharge pipe 40. The first filter 26 and the second filter 27 do not allow the AOB and the anammox bacteria to pass therethrough and allow only the raw water and other microorganisms to pass therethrough.

The first filter 26 and the second filter 27 can be switched in position. That is, after the AOB and the anammox bacteria are filtered out by the second filter 27 in the second step, the first filter 26 and the second filter 27 are switched in position. Then, the raw water is supplied to the first chamber 10. At this time, the AOB and the anammox bacteria captured by the second filter 27 are returned to the first chamber 10 when the raw water is supplied to the first chamber 10. In the second step, the same operation is performed when the first filter 26 filters the raw water without allowing the AOB and the anammox bacteria to pass therethrough.

Figure 5:
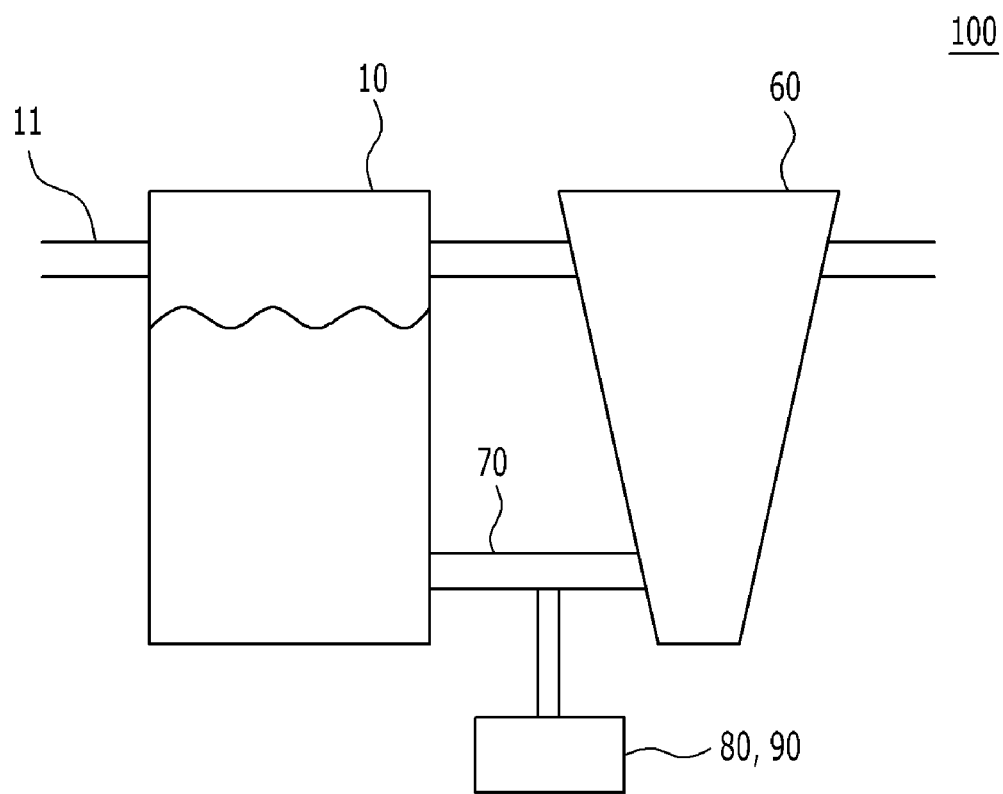
FIG. 5 is a schematic view illustrating an anammox reactor according to another exemplary embodiment.

FIG. 5 is a schematic view illustrating an anammox reactor 100 according to an exemplary embodiment. Referring to FIG. 5, the anammox reactor 100 may include a first chamber 10 that accommodates ammonium oxidizing bacteria (AOB) and anammox bacteria and to which a raw water feed pipe 11 is connected through which raw water is supplied to the first chamber 10, a second chamber 60 that is located downstream of the first chamber 10 and in which suspended solids in the raw water settle to produce sludge, a return pipe 70 to return the sludge from the second chamber 60 to the first chamber 10, and air diffusers 80 and 90 to inject air into the return pipe 70 to supply bubbles to the first chamber 10.

Figure 6:
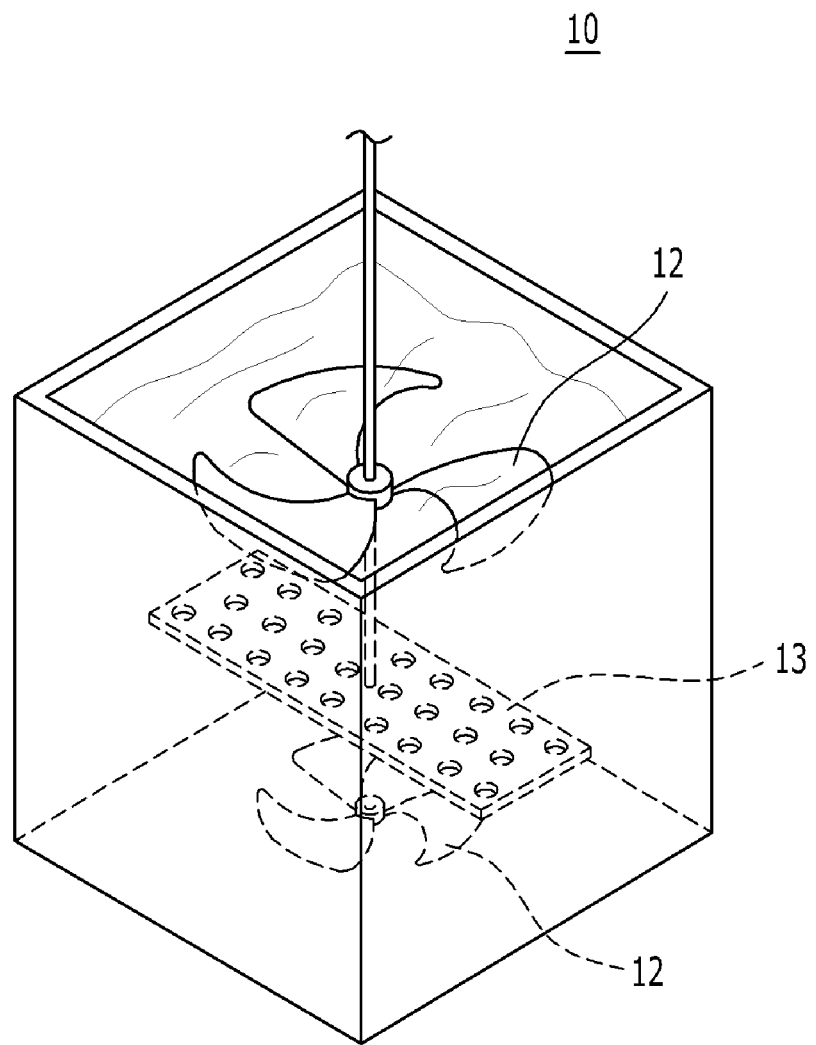
FIG. 6 is a diagram illustrating a first chamber according to an exemplary embodiment.

Referring to FIG. 6, the anammox reactor 100 may further include an agitator 12 provided in the first chamber 10 to agitate the raw water contained in the first chamber 10. The agitator 12 agitates the raw water to facilitate an anammox process. The agitator 12 is of an impeller type equipped with wings. Although a shape of the impeller-type agitator 12 is not particularly limited, it is preferable that an outer wing portion is bent toward a lower end of an inner wing portion. With this shape, because it is possible to push as much water as possible in a desired direction, a stirring effect (i.e., an agitation effect) can be maximized.

The number of agitators 12 provided in the first chamber 10 is two or more. If multiple agitators 12 are provided, the multiple agitators 12 may have the same wing size or different wing sizes. In the case in which the agitators 12 have different wing sizes, the agitators 12 are arranged in a vertical direction such that the agitator with a relatively short wing is located at a relatively low position and the agitator with a relatively long wing is located at a relatively high position.

In this case, the number of revolutions (G-value) of the wings of each of the agitators 12 is not particularly limited, but it is preferably 30 to 110 $sec^{-1}$. For example, the number of revolutions (G-value) of the agitator 12 having the largest wing size is preferably 70 to 110 $sec^{-1}$, and the number of revolutions (G-value) of the agitator 12 having the smallest wing size is preferably 30 to 50 $sec^{-1}$.

Further, at least one perforated plate 13 may be provided between each of the multiple agitators 12. If there is one agitator 12, the perforated plate 13 is located below the agitator 12. A size of multiple holes formed in the perforated plate 13 is not particularly limited. It may be variously selected depending on a size of the perforated plate 13 and a size of the first chamber 10. However, the size is preferably determined to be 3 to 5 cm.

The second chamber 60 located downstream of the first chamber 10 serves as a settling basin. In the second chamber 60, solids contained in the raw water settle to a bottom of the second chamber 60 so that sludge is produced. In a general anammox process, the feeding (influent), mixing, aeration, settling (sedimentation), and water discharge (effluent) take place in one chamber. However, according to the exemplary embodiment, water feeding, mixing, and aeration are carried out by the first chamber 10 and settling and water discharge are carried out by the second chamber 60. Thus, a hydraulic retention time (HRT) can be greatly reduced.

The second chamber 60 is connected to the first chamber 10 by the return pipe 70 and the sludge generated in the second chamber 60 is conveyed to the first chamber 10 via the return pipe 70. Due to the sludge return, anammox bacteria can be returned to the first chamber 10 so as to participate in the anammox reaction.

Figure 7:
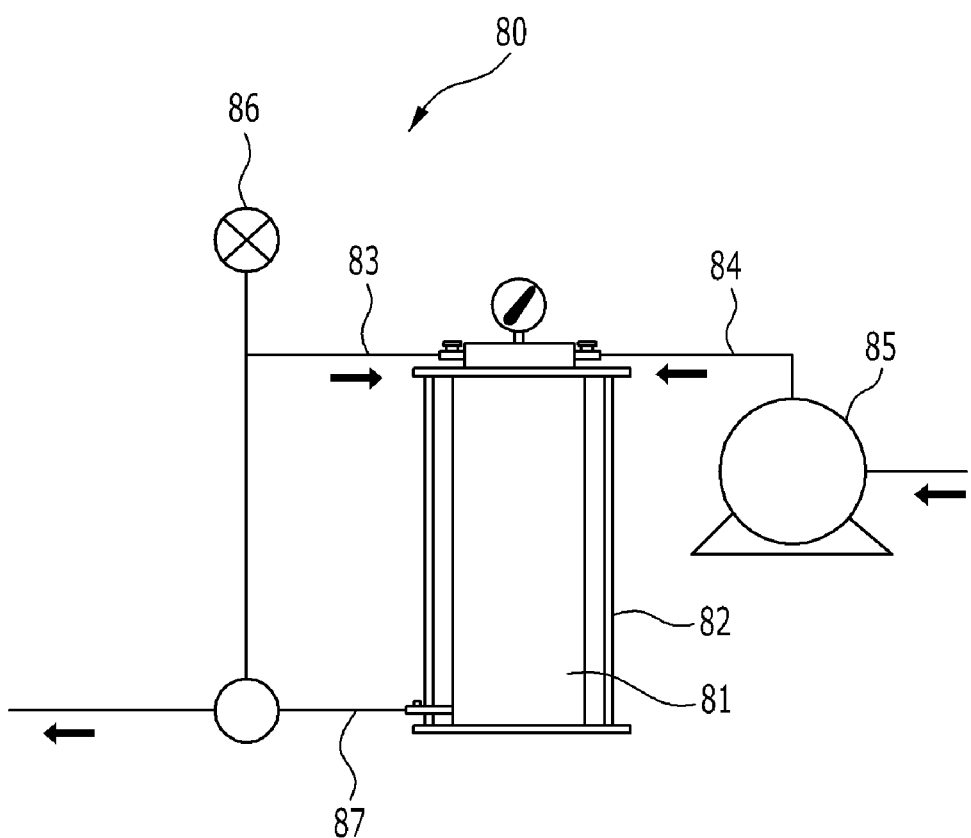
FIGS. 7 and 8 are diagrams illustrating an air diffuser according to exemplary embodiments.
Figure 8:
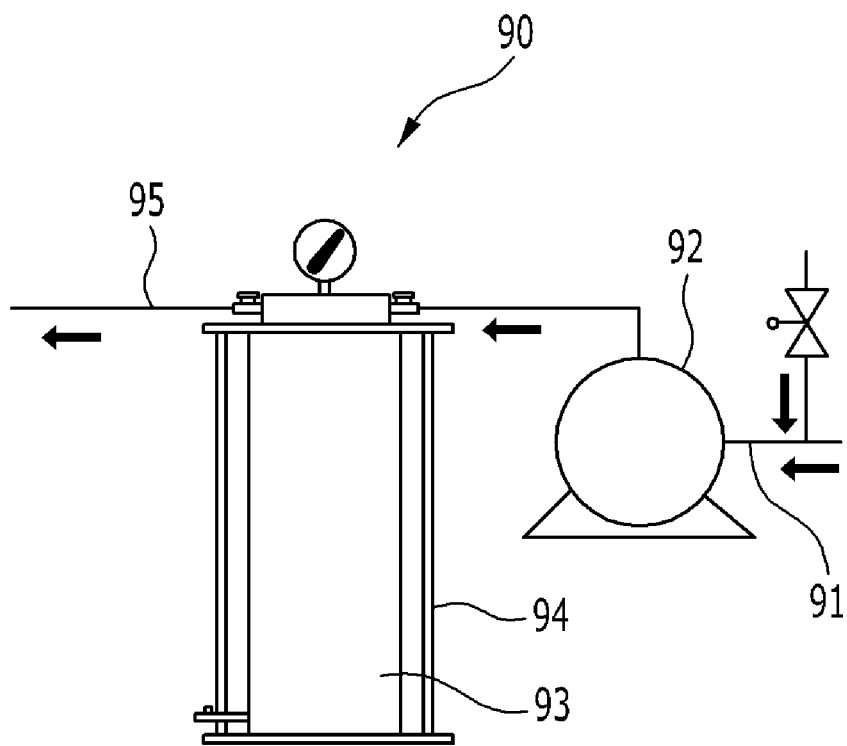

In order to perform the aeration process in the first chamber 10, the return pipe 70 is connected to the air diffusers 80 and 90 that supply bubbles. FIGS. 7 and 8 are diagrams illustrating air diffusers 80 and 90 according to exemplary embodiments.

Referring to FIG. 7, the air diffuser may be a saturator-type air diffuser 80 and may include a pressurized dissolving chamber 81, a saturator 82 to which an air feed pipe 83 and a water feed pipe 84 are connected, a pump 85 for supplying water to the saturator 82 via the water feed pipe 84, a compressor 86 for supplying high-pressure air to the saturator 82 via the air feed pipe 83, and a discharge pipe 87. The discharge pipe 87 is connected to the return pipe 70 of FIG. 5 so that air can be supplied to the first chamber 10 when the sludge is conveyed to the first chamber 10 through the return pipe 70.

Referring to FIG. 8, the air diffuser may be a mixer-type air diffuser 90 and may include a feed pipe 91 through which a mixture of air and water is supplied, a pump 92 connected to the feed pipe 91 to generate bubble water through pumping, a mixer 94 having a mixing chamber 93 in which the bubble water supplied by the pump 92 is contained, and a discharge pipe 95. The discharge pipe 95 is connected to the return pipe 70 so that air can be supplied to the first chamber 10 when the sludge is conveyed to the first chamber 10 through the return pipe 70.

Figure 9:
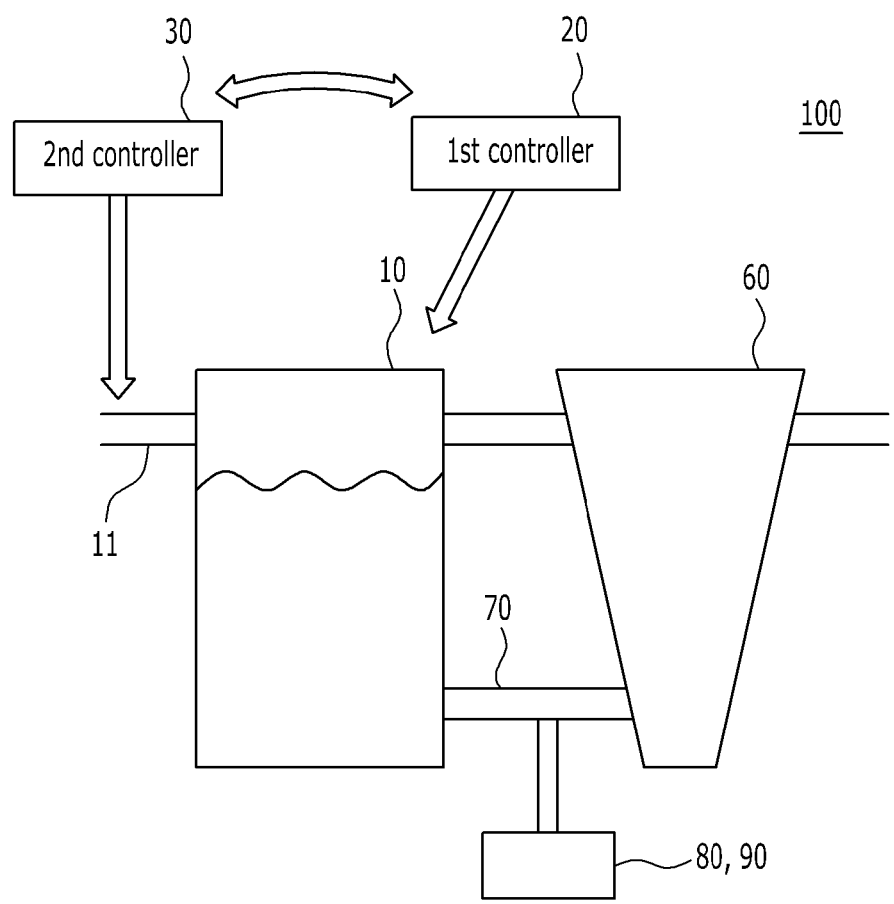
FIG. 9 is a schematic view illustrating a method of controlling an anammox reactor, according to an exemplary embodiment.

FIG. 9 is a diagram schematically illustrating an operation in which the anammox reactor 100 according to the exemplary embodiment is operated under control of the first controller 20 and the second controller 30. Referring to FIG. 9, the anammox reactor 100 may include the first controller 20 for measuring the concentration of nitrogen compounds contained in the raw water supplied into and contained in the first chamber 10 and the second controller 30 for controlling the feed flow rate of the raw water such that the concentration of ammonium ions ($NH_4^+$) contained in the raw water supplied to and contained in the first chamber 10 is maintained within a predetermined range.

The first controller 20 measures the concentration of nitrogen compounds contained in the raw water supplied into and stored in the first chamber 10. The nitrogen compounds include ammonium ions ($NH_4^+$), nitrite ions ($NO_2^-$), nitrate ions ($NO_3^-$), and various salt forms thereof.

As described above with reference to FIG. 2, the first controller 20 may include the first measuring unit 21 for measuring the concentration of ammonium ions ($NH_4^+$), the second measuring unit 22 for measuring the concentration of nitrite ions ($NO_2^-$), and the third measuring unit 23 for measuring the concentration of nitrate ions ($NO_3^-$). The first measuring unit 21 may include the first calculator for calculating the amount of reduced ammonium ions ($NH_4^+$) per unit time from a change in the concentration of ammonium ions ($NH_4^+$) measured, the second measuring unit 22 may include the second calculator for calculating the amount of produced nitrite ions ($NO_2^-$) per unit time from a change in the concentration of nitrite ions ($NO_2^-$) measured, and the third measuring unit 23 may include the third calculator for calculating the amount of produced nitrate ions ($NO_3^-$) per unit time from a change in the concentration of nitrate ions ($NO_3^-$) measured.

The first controller 20 measures a change in the concentration of nitrogen compounds including nitrite ions ($NO_3^-$) by using the first measuring unit 21, the second measuring unit 22, and the third measuring unit 23, and the second controller 30 controls the feed flow rate of the raw water introduced into the first chamber 10 according to the concentration of nitrogen compounds, thereby improving the nitrogen removal efficiency.

A water treatment method of removing nitrogen contained in raw water by using the anammox reactor 100 of FIG. 9 may include a first step in which raw water introduced into the first chamber 10 is agitated and nitrogen in the raw water is removed through an anammox process, a second step in which nitrogen-depleted water generated in the first chamber 10 is transported to the second chamber 60 in which sludge is produced, and a third step in which the sludge generated in the second chamber 60 is transported to the first chamber 10. The exemplary embodiment has the effect of stably maintaining the anammox process in the SBR anammox reactor 100 and greatly reducing the hydraulic retention time (HRT). For example, an additional sedimentation tank (i.e., settling basin 60) is provided at the rear end of the anammox reactor 100, and the sludge generated in the sedimentation tank is transported to the anammox reactor 100. Therefore, it is possible to suitably control the microorganisms such as anammox bacteria required for the anammox reaction, thereby improving the nitrogen removal effect.

In the first step in which the raw water flows into the first chamber 10 and the anammox process is performed to remove nitrogen by anammox bacteria accommodated in the first chamber 10, the feeding, mixing, and aeration among the anammox processes are performed. In the second step in which the raw water flows into the second chamber 60 from the first chamber 10, the sludge is generated in the second chamber 60, and the raw water is discharged to the outside, the sludge is transferred to the first chamber 10, and bubbles are supplied to the first chamber 10 by the air diffusers 80 and 90 along with the sludge. Due to the bubbles supplied to the first chamber 10, the mixing and the aeration of the raw water can be actively performed.

Hereinafter, the structure and effect of the exemplary embodiment will be described in more detail with reference to an example. However, it is understood that this is only an example and other exemplary embodiments are not limited thereto.

Example

An anammox reactor (see FIG. 1) was prepared. The anammox reactor includes sensors for measuring the concentration of ammonium ions ($NH_4^+$), the concentration of nitrite ions ($NO_2^-$), and the concentration of nitrate ions ($NO_3^-$).

Test Example

The anammox reactor was operated under conditions shown in Table 1 and Table 2 below.

TABLE 1

| | | |
|---|---|---|
| Initial volume of reactor ($m^3$) | 15 | |
| $NH_4$—N concentration in raw water (mg/L) | 640 | |
| $NH_4$—N target concentration (mg/L) | 110 | |
| Feed flow rate per sub-cycle ($m^3$) | 3.11 | |
| Sub-cycle | First step: | Second step: |
| Q (Expression 1) | 0.02 | 0.21 |

TABLE 2

| | | |
|---|---|---|
| Initial volume of reactor ($m^3$) | 15 | |
| $NH_4$—N concentration in raw water (mg/L) | 720 | |
| $NH_4$—N target concentration (mg/L) | 170 | |
| Feed flow rate per sub-cycle ($m^3$) | 4.64 | |
| Sub-cycle | First step: | Second step: |
| Q (Expression 1) | 0.88 | 0.74 |

Figure 10:
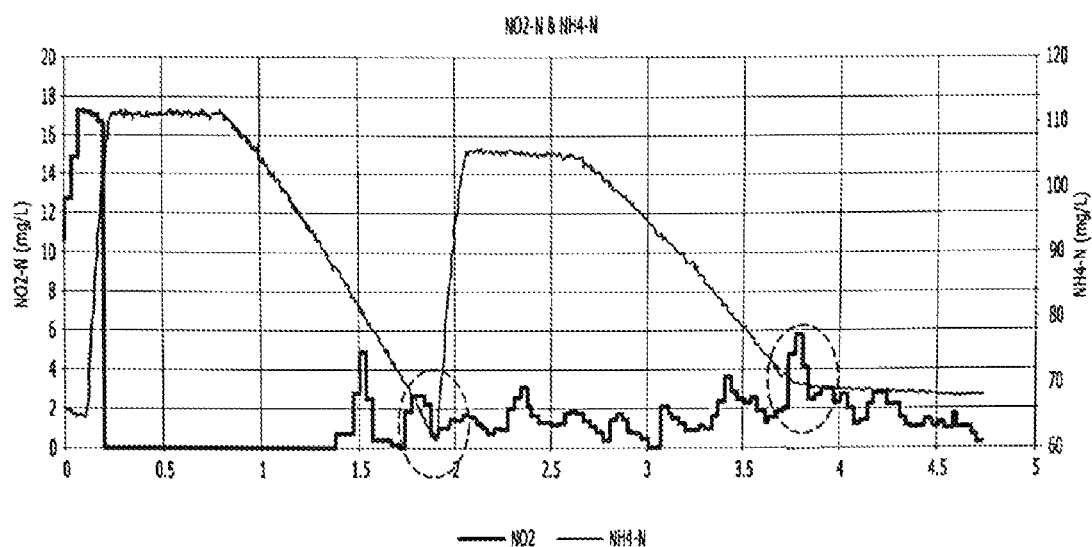
FIG. 10 is a graph showing changes in concentration of nitrogen compounds measured during a water treatment method according to an exemplary embodiment.
Figure 11:
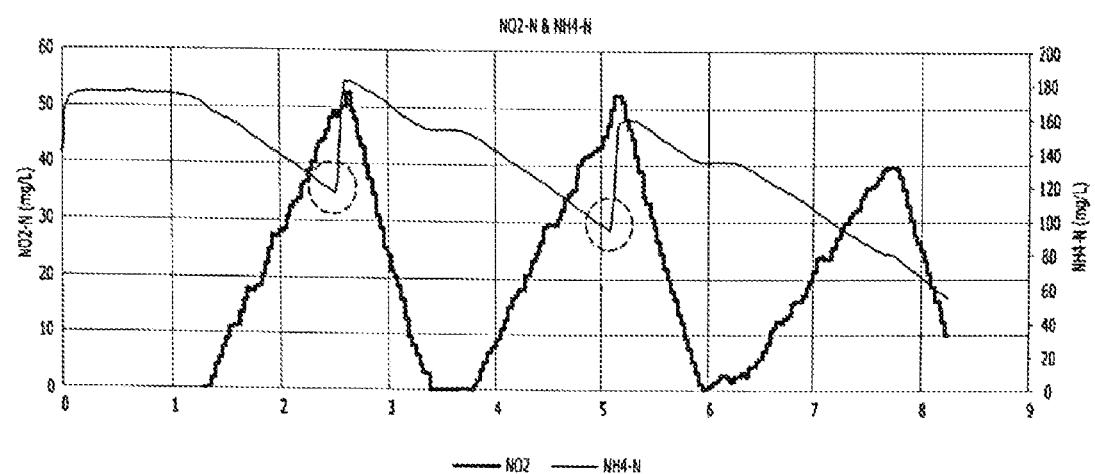
FIG. 11 is a graph showing changes in concentration of nitrogen compounds measured during a water treatment method according to an exemplary embodiment.

Operation results of anammox reactor according to Table 1 and Table 2 are shown in FIGS. 10 and 11, respectively. Table 1 shows that the value of Q of Expression 1 is less than 0.7. In this case, the flow rate of raw water can be increased. Table 2 shows that the value of Q of Expression 1 is 0.7 or greater. In this case, the flow rate of raw water is maintained.

While exemplary embodiments have been described with reference to the accompanying drawings, it is to be understood by those skilled in the art that various modifications in form and details may be made therein without departing from the sprit and scope as defined by the appended claims.

Therefore, the description of the exemplary embodiments should be construed in a descriptive sense and not to limit the scope of the claims, and many alternatives, modifications, and variations will be apparent to those skilled in the art.

What is claimed is:

1. An anammox reactor comprising:
a first chamber configured to accommodate ammonium oxidizing bacteria and anammox bacteria;
a raw water feed pipe through which raw water is supplied to the first chamber;
a raw water discharge pipe through which raw water is discharged from the first chamber to an outside;
a first controller configured to measure a concentration of a nitrogen compound contained in the raw water stored in the first chamber;
a second controller configured to control a feed flow rate of the raw water supplied to the first chamber on the basis of the concentration of the nitrogen compound measured by the first controller; and
a filtration module provided in the first chamber and configured to filter out microorganisms according to size, the filtration module comprising a first filter, a second filter, and a shaft having opposite axial ends respectively connected to the first filter and the second filter,
wherein each of the first filter and the second filter is configured to be disposed at one of two positions inside the first chamber, the two positions including a first position located upstream of an inlet end of the raw water discharge pipe and a second position located upstream of a raw water return pipe communicating with the raw water discharge pipe, and
wherein the shaft includes a center point about which the shaft is rotatable such that each of the first filter and the second filter switches between the first and second positions.

2. The anammox reactor according to claim 1, wherein the second controller controls the feed flow rate of the raw water so that a concentration of ammonium ions ($NH_4^+$) contained in the raw water supplied to and stored in the first chamber is maintained within a predetermined range.

3. The anammox reactor according to claim 1, wherein the anammox bacteria include any one or more species selected from the group consisting of *Candidatus Kuenenia*, *Candidatus Brocadia*, *Candidatus Anammoxoglobus*, *Candidatus Jettenia*, and *Candidatus Scalindua*.

4. The anammox reactor according to claim 2, wherein the first controller includes
a first measuring unit (21) configured to measure the concentration of ammonium ions ($NH_4^+$),
a second measuring unit (22) configured to measure a concentration of nitrite ions ($NO_2^-$), and
a third measuring unit (23) configured to measure a concentration of nitrate ions ($NO_3^-$).

5. The anammox reactor according to claim 4, wherein
the first measuring unit includes a first calculator configured to measure the concentration of ammonium ions ($NH_4^+$) for a unit time and calculate an amount of decrease in ammonium ions ($NH_4^+$) for the unit time,
the second measuring unit includes a second calculator configured to measure the concentration of nitrite ions ($NO_2^-$) for the unit time and calculate an amount of produced nitrite ions ($NO_2^-$) for the unit time, and
the third measuring unit includes a third calculator configured to measure the concentration of nitrate ions ($NO_3^-$) for the unit time and calculate an amount of produced nitrate ions ($NO_3^-$) for the unit time.

6. The anammox reactor according to claim 2, wherein the feed flow rate of the raw water is controlled according to a value of Q calculated by Expression 1, $$Q = \frac{[NO_{2gen}^-] + [NO_{3gen}^-]}{[NH_{4rem}^+]} \quad \text{[Expression 1]}$$

wherein the value of Q is a ratio of a combined concentration of $NO_2^-$ and $NO_3^-$ to an $NH_4^+$ concentration in the first chamber,
wherein, if the calculated value is 0.7 or greater, the feed flow rate of the raw water is controlled such that the concentration of ammonium ions ($NH_4^+$) in the first chamber is maintained within a range from 50 to 100 mg/L, and
wherein, if the calculated value is less than 0.7, the feed flow rate of the raw water is controlled such that the concentration of ammonium ions ($NH_4^+$) in the first chamber is maintained within a range from 100 to 250 mg/L.

7. The anammox reactor according to claim 1,
wherein the raw water flows into the first chamber through the raw water feed pipe, passes through the filtration module provided in the first chamber, exits the first chamber through the raw water discharge pipe, and returns to the first chamber through the raw water return pipe, and
wherein the microorganisms separated by the filtration module according to size include the ammonium oxidizing bacteria and the annamox bacteria.

8. The anammox reactor according to claim 7,
wherein the first filter and the second filter have a pore size such that the ammonium oxidizing bacteria and the anammox bacteria accommodated in the first chamber are prevented from escaping the first chamber, and
wherein, after the first filter and the second filter switch positions, the microorganisms which remain on the surface of the first filter by not being able to pass through the first filter when the raw water flows out through the raw water discharge pipe are washed back to the first chamber when the raw water is returned to the first chamber through the raw water return pipe.

9. The anammox reactor according to claim 1,
wherein the raw water return pipe is configured to return a portion of the raw water transported through the raw water discharge pipe to the first chamber, and
wherein the raw water passing through the filtration module is discharged to the outside through the raw water discharge pipe.

10. The anammox reactor according to claim 1, further comprising:
a second chamber located downstream of the first chamber and configured to cause solids in the raw water supplied from the first chamber to settle to produce sludge;
a return pipe configured to return the sludge generated in the second chamber to the first chamber; and
an air diffuser configured to inject air into the return pipe to supply bubbles to the first chamber.

11. The anammox reactor according to claim 1, further comprising an agitator provided in the first chamber and configured to agitate the raw water introduced into the first chamber.

12. The anammox reactor according to claim 11, wherein
a number of the agitators provided in the first chamber is two or more, the two or more agitators being arranged in a vertical direction, and
a perforated plate is provided between each of the agitators arranged in the vertical direction.

13. A water treatment method of removing nitrogen contained in raw water using an anammox reactor accommodating anammox bacteria, the method comprising:
measuring a concentration of a nitrogen compound contained in the raw water stored in a first chamber;
controlling a feed flow rate of the raw water supplied to the first chamber on the basis of the concentration of the measured nitrogen compound;
passing the raw water through a filtration module provided in the first chamber in order to filter out microorganisms according to size, the filtration module comprising a first filter, a second filter, and a shaft having opposite axial ends respectively connected to the first filter and the second filter, each of the first filter and the second filter is configured to be disposed at one of two positions inside the first chamber, the two positions including
a first position located upstream of an inlet end of a raw water discharge pipe through which the raw water is discharged from the first chamber to an outside, and
a second position located upstream of a raw water return pipe communicating with the raw water discharge pipe; and
rotating the shaft about a center point such that each of the first filter and the second filter switches between the first and second positions.

14. The method according to claim 13, wherein the anammox bacteria include any one or more species selected from the group consisting of *Candidatus Kuenenia*, *Candidatus Brocadia*, *Candidatus Anammoxoglobus*, *Candidatus Jettenia*, and *Candidatus Scalindua*.

15. The method according to claim 13, wherein the measuring the concentration of the nitrogen compound comprises:
measuring a concentration of ammonium ions ($NH_4^+$);
measuring a concentration of nitrite ions ($NO_2^-$); and
measuring a concentration of nitrate ions ($NO_3^-$).

16. The method according to claim 15,
wherein the measuring the concentration of ammonium ions ($NH_4^+$) comprises measuring the concentration of ammonium ions ($NH_4^+$) for a unit time and calculating an amount of decrease in the ammonium ions ($NH_4^+$) for the unit time,
wherein the measuring the concentration of nitrite ions ($NO_2^-$) comprises measuring a change in the concentration of nitrite ions ($NO_2^-$) for the unit time and calculating an amount of produced nitrite ions ($NO_2^-$) for the unit time, and
wherein the measuring the concentration of nitrate ions ($NO_3^-$) comprises measuring a change in the concentration of nitrate ions ($NO_3^-$) for the unit time and calculating an amount of produced nitrate ions ($NO_3^-$) for the unit time.

17. The method according to claim 13, wherein the feed flow rate of the raw water is controlled according to a value calculated by Expression 1, $$Q = \frac{[NO_{2gen}^-] + [NO_{3gen}^-]}{[NH_{4rem}^+]} \qquad \text{[Expression 1]}$$

wherein the value of Q is a ratio of a combined concentration of $NO_2^-$ and $NO_3^-$ to an $NH_4^+$ concentration in the first chamber,
wherein, if the calculated value is 0.7 or greater, the feed flow rate of the raw water is controlled such that the concentration of ammonium ions ($NH_4^+$) in the first chamber is maintained within a range from 50 to 100 mg/L, and
wherein, if the calculated value is less than 0.7, the feed flow rate of the raw water is controlled such that the concentration of ammonium ions ($NH_4^+$) in the first chamber is maintained within a range from 100 to 250 mg/L.

18. The method according to claim 13, further comprising:
supplying the raw water discharged from the first chamber to a second chamber in which solids in the raw water settle to produce sludge; and
returning the sludge generated in the second chamber to the first chamber.

19. The method according to claim 13, wherein the measuring the concentration of the nitrogen, compound comprises agitating the raw water in the first chamber by an agitator provided in the first chamber.

20. The method according to claim 13, wherein the feed flow rate of the raw water supplied to and stored in the first chamber is controlled so that a concentration of ammonium ions ($NH_4^+$) contained in the raw water stored in the first chamber is maintained within a predetermined range.

* * * * *